(12) United States Patent
Kokubo

(10) Patent No.: US 7,043,276 B2
(45) Date of Patent: May 9, 2006

(54) PORTABLE TERMINAL APPARATUS AND DISPLAY CONTROL PROGRAM THEREOF

(75) Inventor: Takeshi Kokubo, Kanagawa (JP)

(73) Assignee: Sony Corporation, Tokyo (JP)

( * ) Notice: Subject to any disclaimer, the term of this patent is extended or adjusted under 35 U.S.C. 154(b) by 588 days.

(21) Appl. No.: 10/265,682

(22) Filed: Oct. 8, 2002

(65) Prior Publication Data

US 2003/0078077 A1 Apr. 24, 2003

(30) Foreign Application Priority Data

Oct. 15, 2001 (JP) ............................. 2001-316319

(51) Int. Cl.
*H04B 1/38* (2006.01)
*H04M 1/00* (2006.01)

(52) U.S. Cl. .................. 455/566; 455/575.1; 455/90.3; 455/457; 455/158.4; 345/1.2; 345/1.3; 345/3.1

(58) Field of Classification Search ................ 455/566, 455/550.1, 575.1, 90.3, 457, 158.4; 345/1.1, 345/1.2, 1.3, 3.1

See application file for complete search history.

(56) References Cited

U.S. PATENT DOCUMENTS

| | | | | |
|---|---|---|---|---|
| 6,215,474 B1 * | 4/2001 | Shah | ........................... | 345/168 |
| 6,233,467 B1 * | 5/2001 | Rydbeck | ..................... | 455/566 |
| 6,297,945 B1 * | 10/2001 | Yamamoto | .................. | 361/681 |
| 6,487,424 B1 * | 11/2002 | Kraft et al. | .................. | 455/566 |
| 6,748,242 B1 * | 6/2004 | Dunleavy | .................... | 455/566 |
| 6,785,562 B1 * | 8/2004 | Lee et al. | .................... | 455/566 |
| 6,850,780 B1 * | 2/2005 | Gioscia et al. | .............. | 455/566 |
| 6,850,781 B1 * | 2/2005 | Goto | .......................... | 455/566 |
| 2001/0011029 A1 * | 8/2001 | Iwabuchi et al. | ........... | 455/566 |
| 2001/0016508 A1 * | 8/2001 | Kido et al. | ................. | 455/575 |
| 2002/0037740 A1 * | 3/2002 | Noda et al. | ................. | 455/550 |
| 2002/0037754 A1 * | 3/2002 | Hama et al. | ................ | 455/566 |
| 2002/0183099 A1 * | 12/2002 | Lee | ............................ | 455/566 |

* cited by examiner

*Primary Examiner*—Nay Maung
*Assistant Examiner*—Shaima Q. Aminzay
(74) *Attorney, Agent, or Firm*—Oblon, Spivak, McClelland, Maier & Neustadt, P.C.

(57) ABSTRACT

A mobile terminal apparatus is provided in order to effectively utilizing more than one display area. At least when a specific application is executed, a mobile terminal apparatus has a first display mode which uses its screen upon dividing its main display into top and bottom display areas and a center display area, and also has a second display mode using the entire screen main display area without division. Based on a key operation as well as execution and termination of the application, the first and second display modes are switched over. In the second display mode, at least part of the contents shown on the top and bottom display areas in the first display mode are exhibited on a sub display area. For example, when under the second display mode, as the contents to be exhibited on the sub display area, the contents shown on the top and bottom display areas as well as the content shown on the sub display section are switched over or shown by scrolling.

12 Claims, 10 Drawing Sheets

PORTABLE TERMINAL APPARATUS AND DISPLAY CONTROL PROGRAM THEREOF

CROSS REFERENCE TO RELATED APPLICATIONS

This application claims priority to Japanese Patent Application No. JP 2001-316319, filed on Oct. 15, 2001, the disclosure of such application being herein incorporated by reference to the extent permitted by law.

BACKGROUND OF THE INVENTION

1. Field of the Invention

The present invention relates to a portable terminal apparatus represented by a portable telephone device having at least one display section.

2. Description of the Related Art

Significant advances have been made recently in the technology of portable terminals represented typically by portable or mobile telephones, making available a variety of functions such as the Internet connection, game software downloading and execution, etc. Efforts have been made towards providing color images and larger screens.

Nevertheless, there are limits to providing larger screens inasmuch as increasingly smaller size and lightweight are required of a portable (or, mobile) terminal apparatus. There is simply no comparison to a display unit of a personal computer.

On the other hand, even in a mobile telephone, it has become possible to prepare an e-mail, have access thereto or to Web information, and even so far as to execute games and the like. In regard to such use of various application programs, the size of a display area leaves room for improvement.

Particularly, in many existing mobile telephone devices, which are mobile or portable terminal devices having communications functions, their display area is separated in strips on an upper portion and a lower portion of the display area, which show data related to remaining battery level, service area/no service area, signal strength indication (for example, number of indicative bars), a guide to key operations (key operation information) and other information. What has brought about is that the available display area is being increasingly compressed. These circumstances may cause a mobile telephone having a small screen to be less attractive to users seeking larger screen size, with the consequence of decreasing market competitiveness of the product.

Now, there is currently available a new model of mobile telephone device, particularly of a folding type, which is designed so as to enable the user to look at predetermined information through a relatively small auxiliary or sub-display section provided on the outside of its cover. Yet, when the cover of such mobile telephone is opened, only the main display section appears for viewing with the sub display section becomes unavailable for view. On the other hand, the applicant of the present invention has proposed, in Japanese Patent Application Publication No. 2001-172164, a mobile telephone terminal equipped with a sub display section so constructed as to enable the user to view and confirm in either status of the cover being flipped open/closed or the cover being shut.

In this manner, efforts are made in the conventional mobile terminal apparatus, particularly mobile telephone devices, to expand its display area. Nonetheless, its expansion is not without limits, and appropriate measures are required so as to make effective use of the limited available display area.

SUMMARY OF THE INVENTION

The present invention has been conceived in view of this background in order to meet the requirements for providing a mobile terminal apparatus that would be capable of efficiently utilizing a plurality of display areas.

A mobile terminal apparatus according to a preferred embodiment of the present invention has at least a first, a second, and a third display area and includes at least one display section, an operating section having various operation keys, and a display control means for controlling the display section; the display control means on its turn has a first display mode for displaying a performing content related to the application in the first display area and another content on the second and third display areas; a second display mode for displaying the content displayed on the first display area across at least the first and second display areas and the content displayed on the second display area on the third display area; also, a switching between the first display mode and the second display mode is carried out according to a predetermined factor.

The predetermined factor, for example, may include operation of operation keys or execution and termination of a predetermined application.

In this way, even though the first display mode may be the same display mode as the conventional modes, since the second display mode can show the execution or performing content of the application of the first display area over a plurality of display areas, it becomes possible to virtually expand the screen size according to the situation.

While in the second display mode, the display control means shows, on the third display area, a content shown in at least one of the second display area and the third display area. This makes it possible to eliminate or reduce any ill effect due to the expansion of the first display area.

In the case where a fourth display area is available, the display control means shows, when in the second display mode, the content shown on the first display area at least across the first, second, and fourth display areas, and displaying, on the third display area, the content shown on the second and the third display areas as well as at least part of a content shown on the fourth display area.

When the entire content to be shown on the third display area at the time of the second display mode cannot be shown at once, or is not shown, the content shown on the third display area may be switched over to be shown according to operation of operation keys or shown or displayed upon scrolling.

Under the second display mode, the display control means shows the content of a predetermined basic screen on the third display area, so that in the event of any change in a predetermined status, the display content of the third display area can be changed from the basic screen over to a display content associated with the status change. In this instance, the necessary content can be recognized on the part of the user without executing operation.

Subsequent to changing the basic screen over to the display content associated with the status change, after a lapse of time, the display control means may be operated to return the display content on the third display area to the basic screen. After recognizing the switched over content, this makes it possible for the screen to return to the original screen automatically.

In the mobile terminal apparatus provided with a main display section and a sub display section constituting the display section, for example, the main display section may contain the first and the second display areas, while the sub display section may contain the third display area.

The mobile terminal apparatus according to a preferred embodiment of the present invention when considered from another standpoint, the mobile terminal apparatus having a main display section and a sub display section, the apparatus including a first display mode using, at least when a specific application is executed, a screen of the main display section through division thereof into an upper and/or a lower strip shaped display area portion and a remaining display area, and a second display mode using the entire screen of the main display without division; a switch over between the first and the second display mode is carried out based on a predetermined factor, the second display mode operating to show, on the sub display section, the content shown on the upper and/or top display area in the first display mode as well as at least part of the content shown on the sub display section.

According to another preferred embodiment of the present invention, there is provided a display control method for a mobile terminal apparatus having at least a first, a second, and a third display area, the method including the steps of displaying, under a first display mode, a performing content related an application on the first display area and other content on a second and a third display area; displaying, under a second display mode, the content displayed on the first display area at least across the first and second display areas and the content displayed on the second display area on the third display area; and switching between the first display mode and second display mode according to a predetermined factor. The present invention may also include computer program that allows a computer to realize the steps of the method mentioned above and, furthermore, may include a recording medium in which the display control program is stored for realizing the steps of such method.

According to the preferred embodiments of the present invention, in a mobile terminal apparatus having a plurality of display areas, processing at work in the main display area is shown across a plurality of display areas, and by exhibiting the content not shown because of such displaying across other display areas, the plurality of display areas can be effectively used according to the circumstances. It may result that the convenience is increased as feature of the present preferred embodiments of the invention.

In addition, in the mobile terminal apparatus having a main display section and a sub display section, upon showing the display area of the main display section across a plurality of display areas, it results that the available display area for the application program of the main display section can be expanded, hence, the manufacturers and distributors of the mobile terminal apparatus may emphasize the feature of providing an enlarged display section in order to increasing the appeal to the consumer.

BRIEF DESCRIPTION OF THE DRAWINGS

The above and other objects, features and advantages of the present invention will become more apparent to those skilled in the art from the following description of the presently preferred exemplary embodiments of the invention taken in conjunction with the accompanying drawings, in which.

DETAILED DESCRIPTION OF THE PREFERRED EMBODIMENTS

An embodiment of the present invention will now be described in detail below with reference to the accompanying drawings.

Figure 1A:
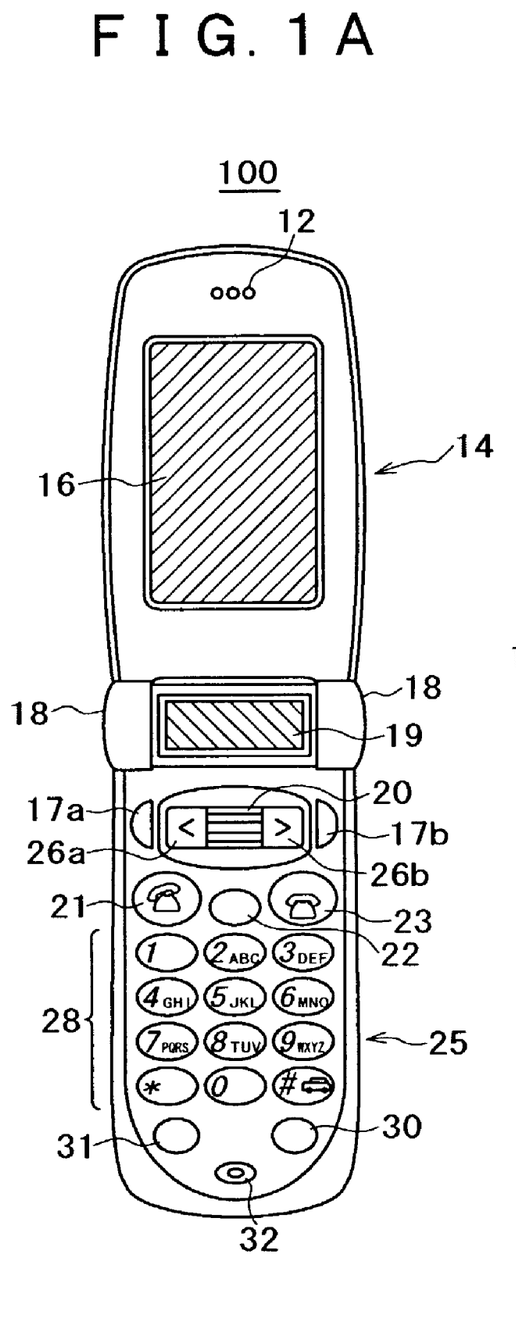
FIG. 1A shows an external view of a mobile terminal apparatus (may be simply referred to as a mobile terminal) of a folding type having a sub display section, according to a preferred embodiment of the present invention, in which the apparatus is open (unfolded)
Figure 1B:
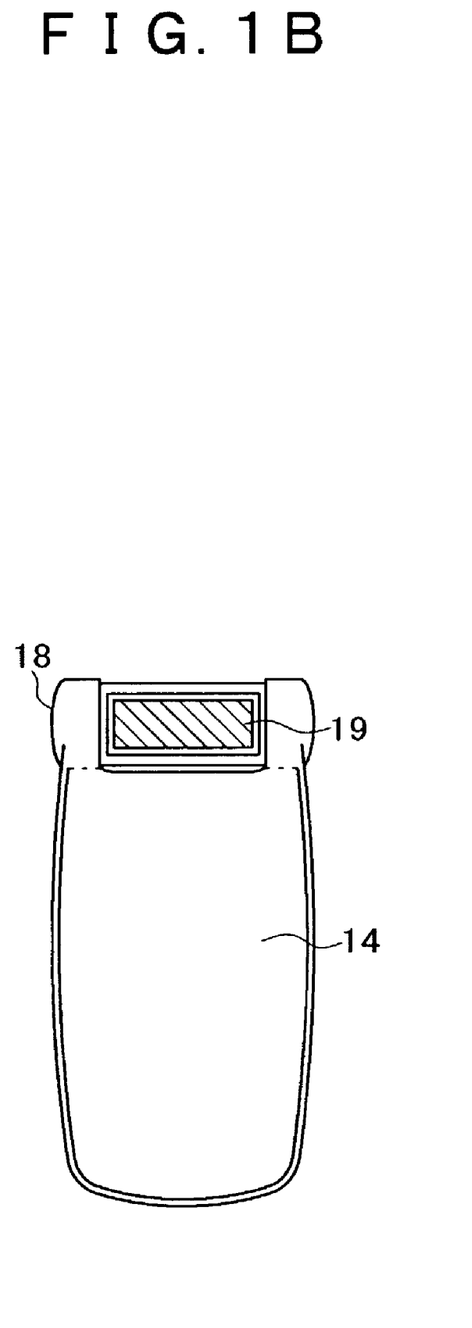
FIG. 1B shows the apparatus closed (folded)

FIG. 1 is an external view of a mobile terminal apparatus (may be simply referred to as a mobile terminal) 100 of a folding type having a sub display section. FIG. 1A is its front view when it is opened (unfolded), and FIG. 1B is its front view when it is shut or closed (folded).

The mobile terminal 100 includes a cover 14 linked to a body 25 via a hinge portion 18 capable of opening and closing (or folding and unfolding). On the upper part of the inside of the cover 14 there is placed a speaker 12, and on the internal main face there is disposed a main display section 16 (for example, a planar display device such as a liquid crystal display). There is arranged a sub display section 19 (for example, this too may be a planar display device such as a liquid crystal display) on the center of the hinge portion 18. The sub display section 19 is affixed on the body 25, so that even if the cover 14 is turned relative to the body 25, the sub display section 19 itself does not rotate. The width of the screen on the sub display section is close (somewhat smaller) to the width of the screen on the main display section 16. Its height in a longitudinal direction is about a size that fits to the hinge portion. The sub display section 19 is provided inside the hinge portion 18, so that as shown in FIG. 1B, the screen on the sub display section is exposed, even when the cover 14 is closed with respect to the body 25 (the mobile telephone folded), so the sub display can be viewed either with the mobile terminal device folded or unfolded.

However, FIG. 1 is just an example of a mobile terminal to which the present application is applied, and the present invention is in no way limited to it. Namely, the sub display section 19 does not necessarily have to be positioned in the hinge portion 18, nor the sub display section 19 itself is essential as a preferred embodiment of the present invention.

On the inside surface of the body 25, there are arranged a jog dial 20 on the center of the upper part, left and right keys 26a and 26b on the end of both sides, and soft keys 17a and 17b on the further end of both sides. The jog dial 20 is a rotatable push switch. The soft keys 17a and 17b are the operation keys with optional functions assigned according to various menu items and the screen, the assigned functions being made known to the user by the display content of a key operating display area. With regard to the left and right keys 26a and 26b, whether to use these keys or not in each applicable scene of the mobile terminal is shown in the key operating display area. Under these operation keys, as in FIG. 1A, there are arranged a telephone key 21, a clear (or reset, i.e., input resetting) key 22, and a power key/clear back key 23. Further below them there are placed numeric keys 28, under which a memorandum key 30 and a "manner" or "etiquette" (beep-silence) key 31 are placed. A microphone 32 is arranged at the bottom or lower portion of the body 25.

Figure 2:
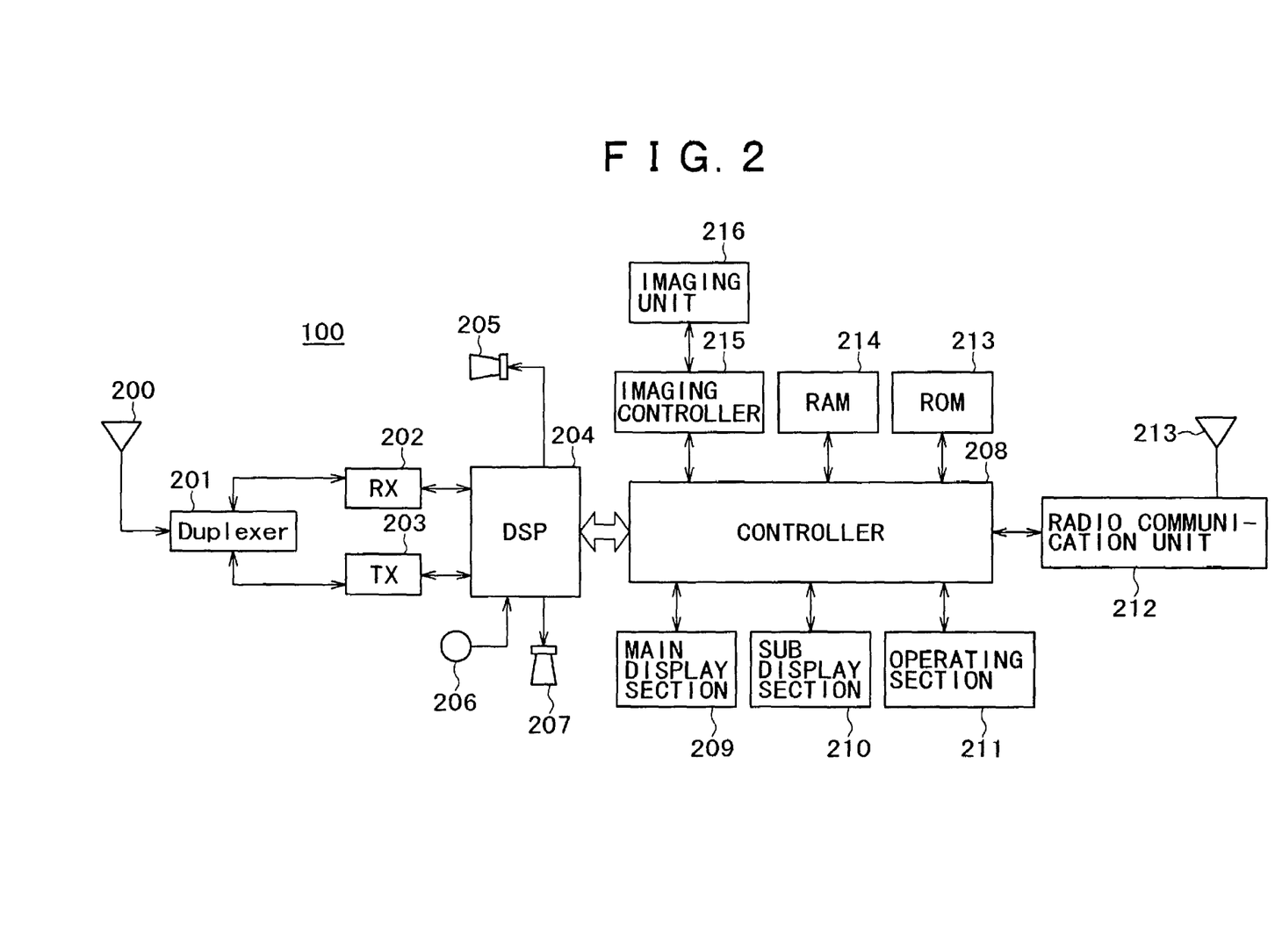
FIG. 2 shows a block diagram showing a hardware configuration of a mobile terminal, according to a preferred embodiment of the present invention.

FIG. 2 presents, a block diagram showing a hardware configuration of a mobile terminal according to a preferred embodiment of the present invention.

The mobile terminal 100 includes, as its components related to the telephone function, an antenna 200, a duplexer 201, a receiver (RX) 202, a transmitter (TX) 203, a DSP (Digital Signal Processor) 204, a speaker 205, a microphone 206, and an ear receiver 207. The mobile terminal further includes, as its components related to control of the mobile terminal, a controller 208, a main display section 209 (corresponding to 16 in FIG. 1, for example), a sub display section 210 (corresponding to 19 in FIG. 1, for example), an operating section 211, a ROM 213, and a RAM 214. The operating section 211 corresponds to various keys and buttons shown in FIG. 1. The ROM 23 stores a control program for realizing movement of the present preferred embodiment to be explained later. The ROM 213 may include a writable memory such as a flash ROM. Though not being particularly essential elements to the present invention, in this example, the mobile terminal 100 is also provided with a radio communication unit 212 operable under a standard such as Bluetooth (a trademark) and an antenna 213 therefor, an imaging controller 215, and a imaging unit 216.

Figure 3:
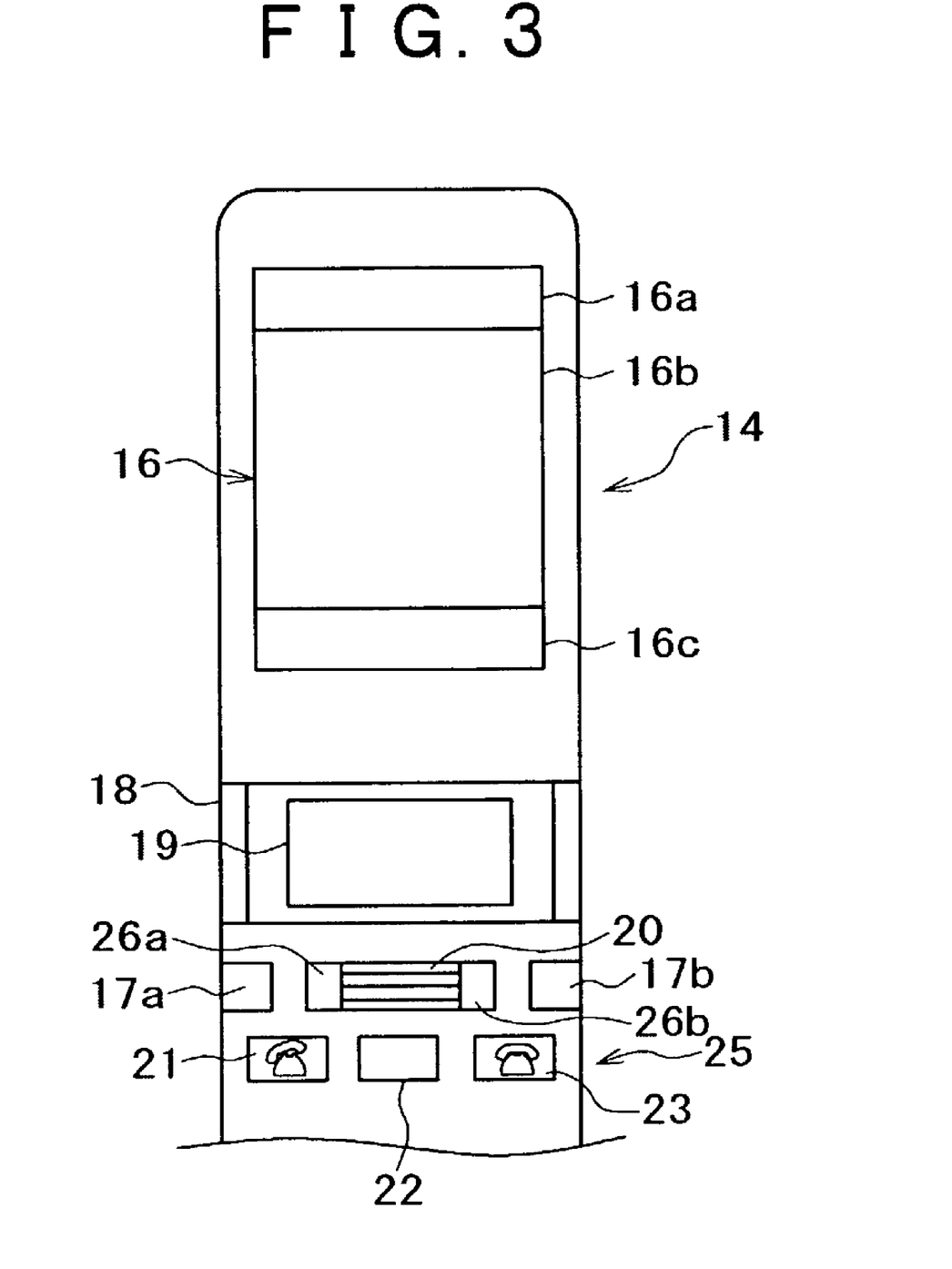
FIG. 3 shows a diagram showing a plurality of display areas of the mobile terminal of FIG. 1, according to a preferred embodiment of the present invention.

An example of operation of the present preferred embodiment will be described in the following. Referring to FIG. 3, a plurality of display areas in the mobile terminal in FIG. 1 will be explained. In the example of FIG. 3, a screen on the main display section 209 is divided into three display areas 16b, 16a, and 16c on a large display area B in the center and two strips of small display areas A and C at the, upper edge and the lower edge.

Figure 4A:
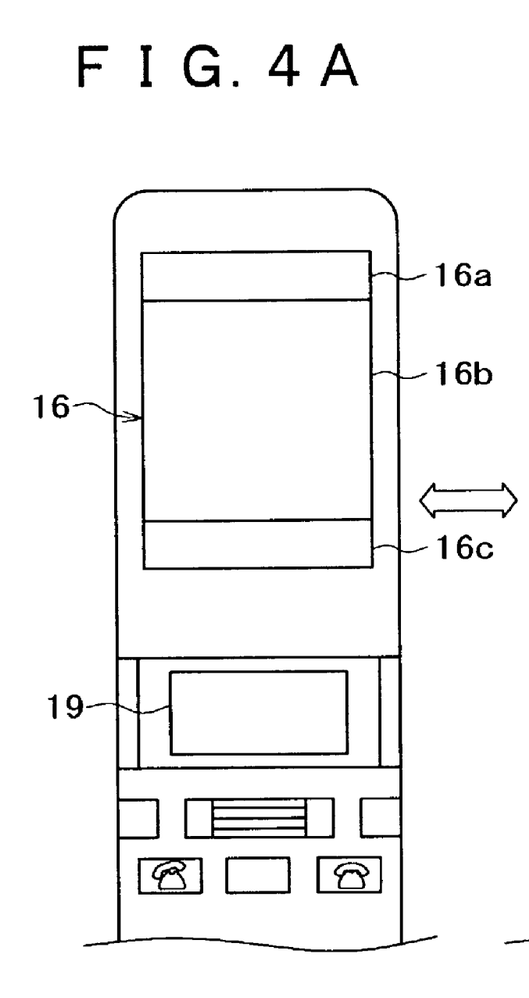
FIGS. 4A and 4B show diagrams of switch over between a normal display mode and a full screen display mode, according to a preferred embodiment of the present invention.

In the normal display mode, as shown in FIG. 4A, the controller 208 displays, on the display area 16b on the center of the main display section 209 (FIG. 2), a display image of an application in use such as viewer for images captured by the imaging unit 216, a mailer such as i-Appli (a trademark) for creating mail messages and for providing access to mails, Web browsers and the like. Also, the controller 208, in this example, shows the remaining battery level, indication of service area/no service area, signal strength and the like on the display area 16a, showing key operation information and the like on the display area 16c. On the other hand, random information (for example, a predetermined icon and date and time) is displayed on the sub display section 19.

Figure 4B:
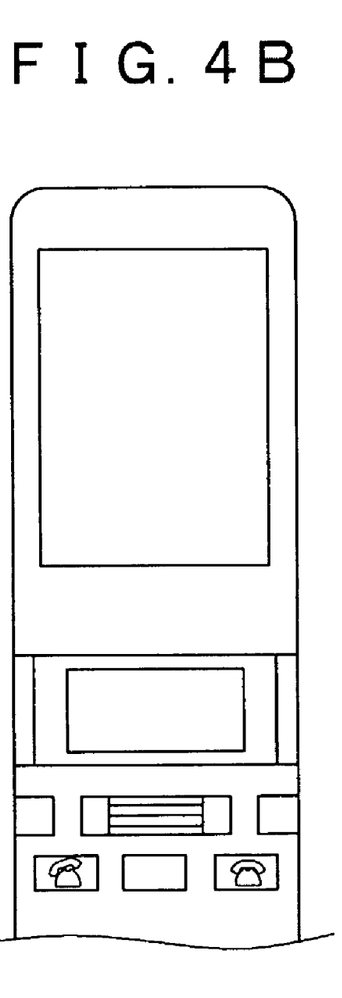

In the normal display mode, when the user operates a specific key, the mobile terminal shifts to a full screen display mode as shown in FIG. 4B. In such full screen display mode, the display content of an application shown on the display area 16b of FIG. 3 is shown across the entire display areas 16a, 16b, and 16c on the main display section 16. This makes it specifically possible, for example, to carry out mail creation and access to mails, access to the Web, games and the like on a relatively large screen. In the full screen display mode, the contents shown on the display areas 16a and 16b of FIG. 3 are shown on the sub display section 210. In an example of this drawing, on the sub display section 19, there are shown an icon which has been on display there, an information display shown on the display area 16a, and all the key operation displays shown on the display area 16c simultaneously or partly in sequential order. For executing a "simultaneous" display, image contraction is implemented, thereby reducing characters and icons in size. In order to avoid this, these displays are successively shown according to the user's instructions.

Figure 5A:
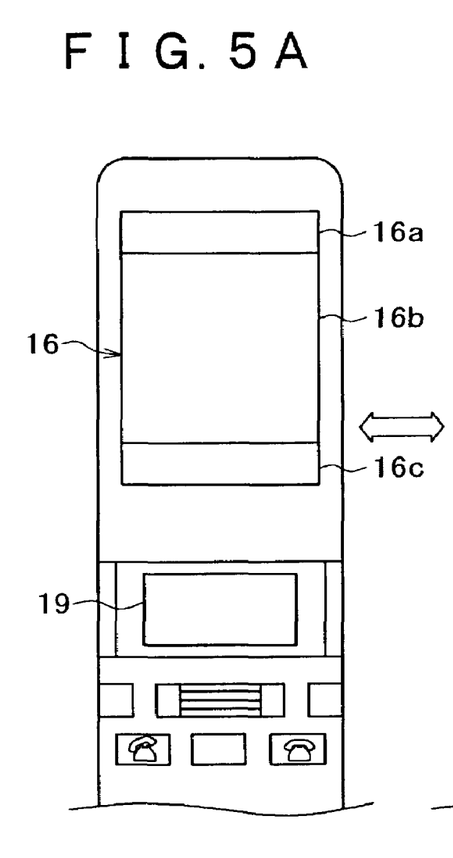
FIGS. 5A and 5B show diagrams showing the switch over of the sub display section in the full screen display mode, according to a preferred embodiment of the present invention.
Figure 5B:
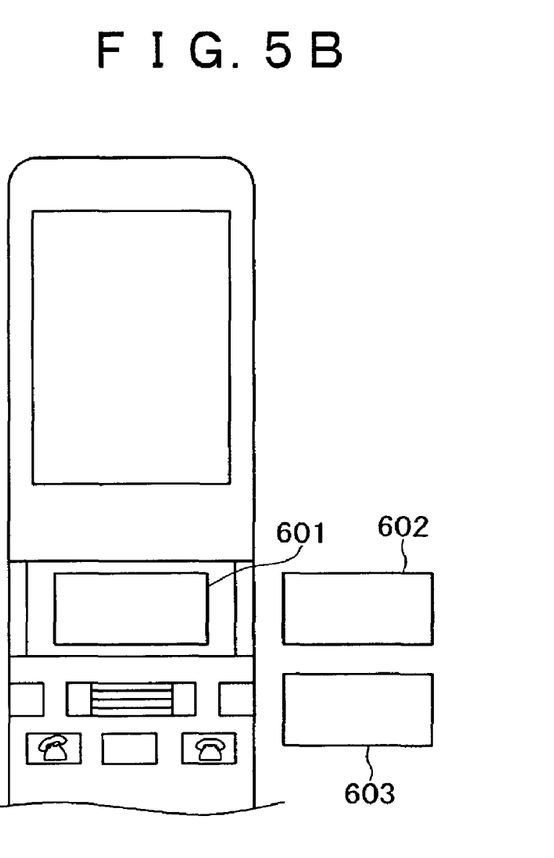

On the successive display, for example, when a shift is made from the normal display of FIG. 5A to the full display mode of FIG. 5B, the screens of the icon display 601, the information display 602, and the key operating display 603 are switched over in cyclic order and shown according to the user's predetermined operation on the sub display section 19. Alternatively, these displays are shown in such a way that they can be viewed in cyclic order by screen scrolling. Here is shown a case of changing over or scrolling three screens. Part of the displays (for example, the screen of the display area D) may be removed from the viewable status at least temporarily. In this case, selection of which screen to be removed may be predetermined, but may also be selectively specified by the user.

Figure 6:
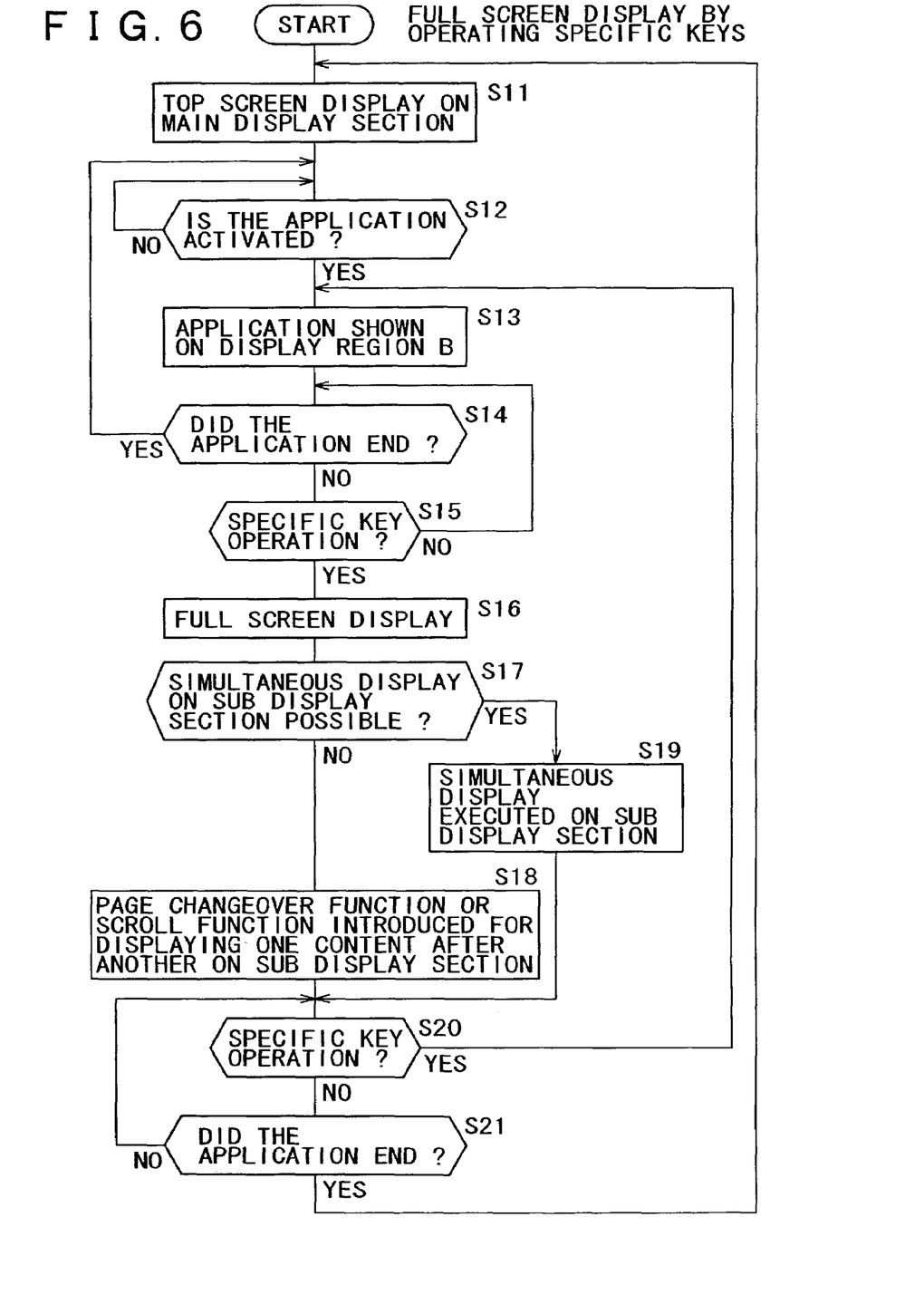
FIG. 6 shows a flowchart showing an example of display-related processing, according to a preferred embodiment of the present invention.

An example of display-related process flow for the preferred embodiment of the present invention is shown in FIG. 6.

When the power is turned on, the process starts with START in the figure. Although the END status is not listed in the drawing, it is an unconditional END when the power is turned off. It is to be noted that activating an application while another application is activated is not considered in the example of FIG. 6.

In the processing shown in FIG. 6, first, in step S11, a display of the top screen (initial screen) is executed on the main display section 16. In this top screen display, the display area 16a of FIG. 3 shows information on the remaining battery level, service area/no service area, signal strength indication and the like, the display area 16b displaying the content of the top screen, and the displaying region 16c showing key operating information. Thereafter, once an application is activated, i.e., Yes in step S12, the content of the application is shown in the display area 16b, in step S13. At this event, as mentioned above, information on the remaining battery level, service area/no service area, signal strength and the like as well as key operating information and the like are shown on the display areas 16a and 16c.

When a specific key operation is performed by the user until the application comes to an end with Yes in step S15, display is shifted to full screen display mode, in step S16. As mentioned previously, at this time, if the original display content and the display contents of the display areas 16a and 16c can all be simultaneously shown on the sub display section, a simultaneous display is executed, in step S19. Even if the display is executable, the user may predetermined in the initial setting whether the simultaneous display is to be executed or not. Step S17 at that time is not "Is the simultaneous display possible on the sub display section?" but the assessment of the status should be based on "Is the simultaneous display going to be executed on the sub display section?"

If the simultaneous display is not possible in Step S17, i.e., Yes in step S17 as described above, partial display is executed on the sub display section by introducing the page switch over function or scroll function, in step S18. In this case, there may be considered a method of temporarily changing over either content (for example, an icon display shown on the sub display section) or of removing either content as a subject of scroll display.

Next, in the case where a specific key operation, i.e., Yes in step S20, is executed to return to the original display mode until the application ends, a return to Step S13 is performed. At this event, the display contents of the display areas 16a and 16c and the display content 16d of the sub display section return to the original status.

It is to be noted that when the application ends (Did the application end?) in Step S14, a return may be made not to Step 12 but to Step 11. Also, when the application ends in Step S21, a return may be made not to Step S11 but to Step S12.

Figure 7A:
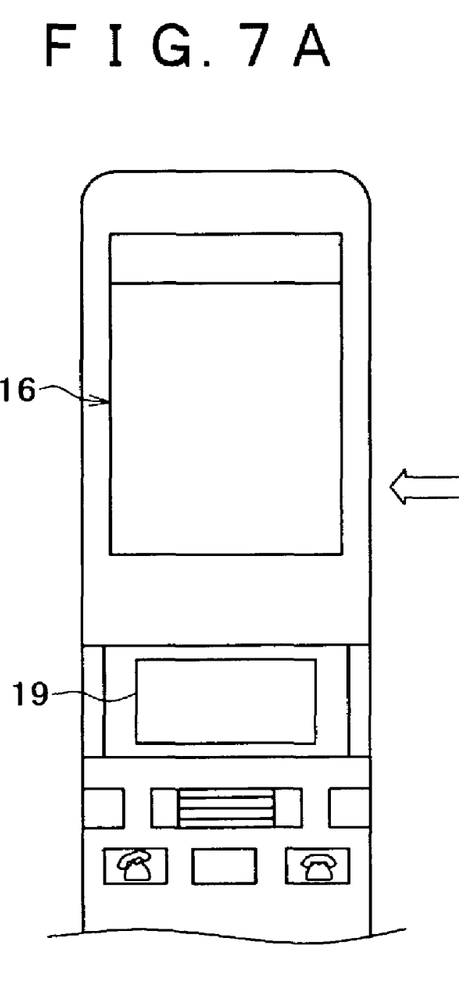
FIGS. 7A and 7B show diagrams illustrating a variation of the preferred embodiment of the present invention.
Figure 7B:
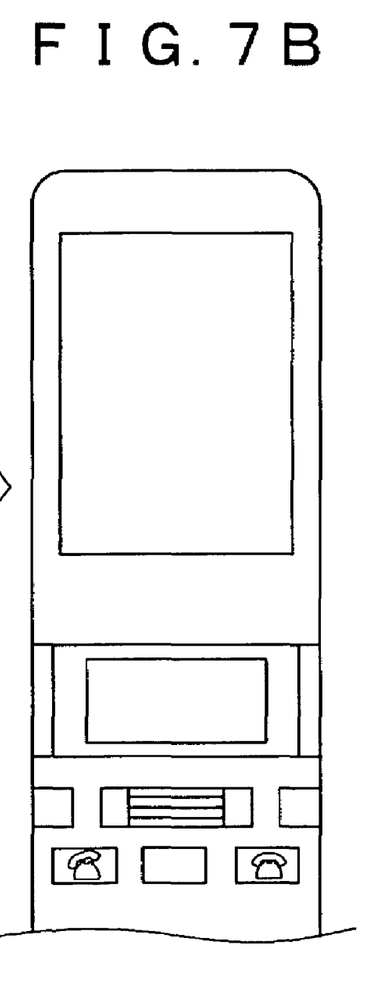
Figure 8A:
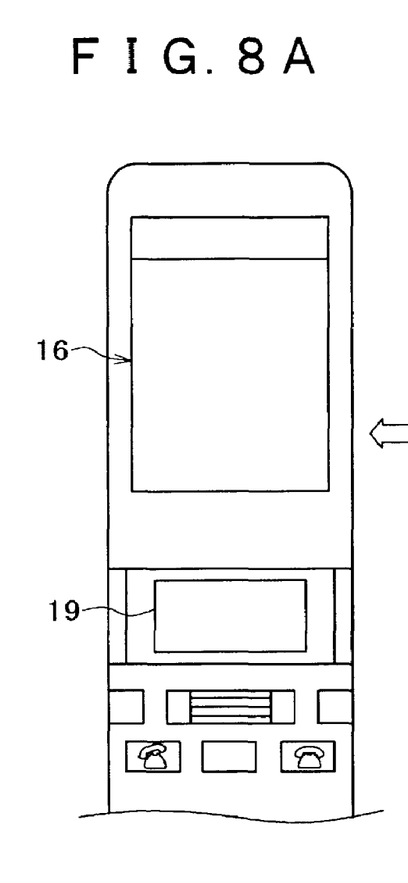
FIGS. 8A and 8B show diagrams of the switch over of the sub display section in the full screen display mode in the example of the variation of FIG. 7, according to a preferred embodiment of the present invention.
Figure 8B:
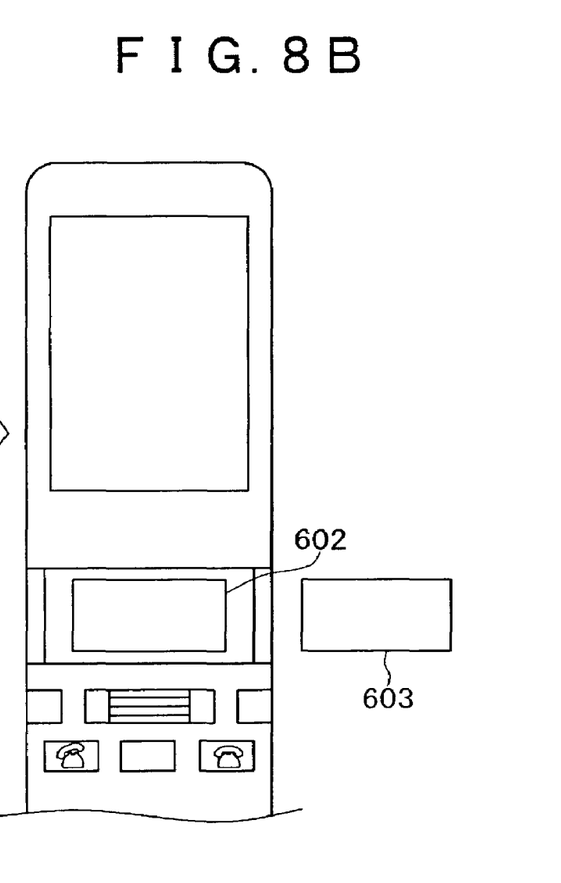

In the processing of the full screen display by means of operating the specific keys mentioned above, there is shown a case where the main display section has three display areas in the normal display mode. An example of its variation will be described by reference to FIG. 7. The preferred embodiment of the present invention may be also applicable to a case of two display areas on the main display section 16 at the time of the normal display as shown in FIG. 7A. In this instance, the example of FIG. 4A indicates that the key operating display assigned to the display area 16c is executed on the sub display section 19 (of display area 16d). In the full screen display mode, as shown in FIG. 7B, the information display and the key operating display are simultaneously executed on the sub display section 19, or as shown in FIG. 8B, the information display 602 and the key operating display 603 are subjected to page switch over or scroll display.

Figure 9:
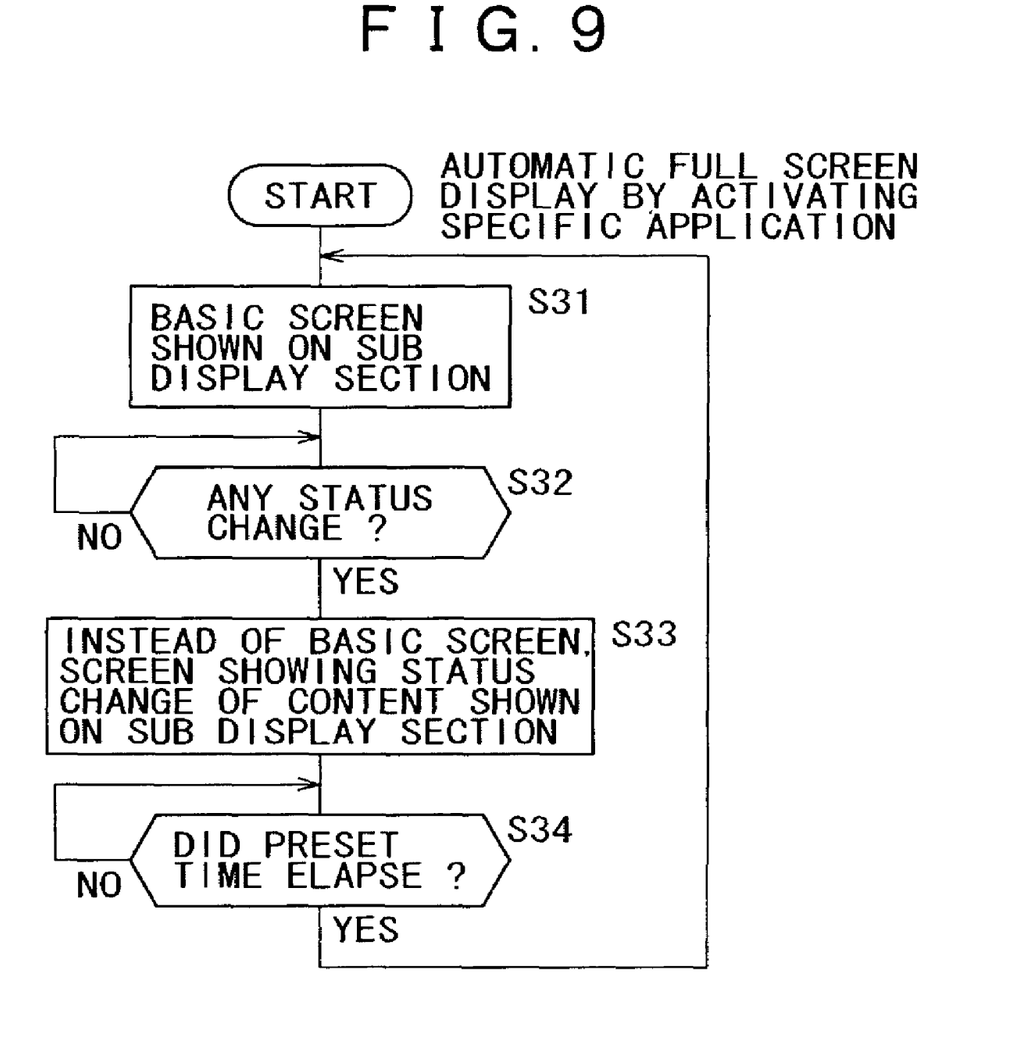
FIG. 9 shows an example of processing when the display screen is automatically switched over to the sub display section, according to a preferred embodiment of the present invention.

In the processing described above, the page switch over or scroll display when the sub display section is unable to display (or, does not display) simultaneously the contents of a plurality of screens, is executed by key operation (dial operation may be included) performed by the user. Nevertheless, a method of making this operation automatic may be considered. Namely, while the full screen display mode is on, a content considered to have relatively high priority is displayed as the basic screen on the sub display section, and when a change of some status occurs, in order to inform the user of such change, the display content of the sub display section is adapted to be switched over. Referring to FIG. 9, there will be described an example of a flow of processing of such automatic switch over of the display screen on the sub display section. This processing corresponds to the processing part regarding the sub display section when the full screen display mode is on. It is applicable to either the case of dividing the main display section 16 into three parts as shown in FIG. 5A or the case of splitting the main display section 16 into half as shown in FIG. 8A.

First, the basic screen is shown on the sub display section, in step S31. The content of the basic screen is, for example, the content shown on the sub display section in the normal display mode and the content shown on the main display section in the normal display mode, which is a predetermined portion of the content turned out of the main display section at the time of shifting to the full screen display mode. For example, it may be considered a case of key operation information and the like that would be suitable to the application. Thereafter, monitoring is conducted to see if there is any change in the predetermined status, in step S32. The predetermined status in this context may include, for example, changes in the service area/no service area indication, arrival of mail and the like, a decrease in the remaining battery level and the like, which form the kind of information that should be notified to the user under some degree of urgency. When this type of change in the status occurs, a switch is made to present the basic screen, and the screen showing the content of the change in the status is shown on the sub display section, in step S33.

This display is provided for a predetermined period of time, and after a lapse thereof, in step S34, a return is again made to step S31, i.e., to the display of the basic screen. At this event, it is desirable to generate an alarm by issuing a predetermined sound or intermittently changing the brightness of the screen and the like in order to capt the user's attention. For the "predetermined time," a period from a few seconds to 20 to 30 seconds, typically about 5 seconds, is assumed, whereas its length may vary depending on the situation. In some cases, the "predetermined time" may be set as limitless so that a return may be made to the display of the basic screen after waiting for the user's specific key operation. It should be understood that the contents of the "basic screen" and the "predetermined status" as mentioned herein are for illustrative purposes only, and the present invention should not be limited to the examples presented herein.

Next, another preferred embodiment of the present invention will be described by referring to the flowchart of FIG. 10. While the shift from the normal display mode to the full screen display mode is executed according to the user's specific key operation in the preferred embodiment mentioned above, the present preferred embodiment carries out such shift not in terms of the user's key operation but automatically when a specific application is activated. However, it is to be pointed out that such automatic shift to the full screen display mode may be designed so as to be made valid or invalid by the user's initial settings.

Figure 10:
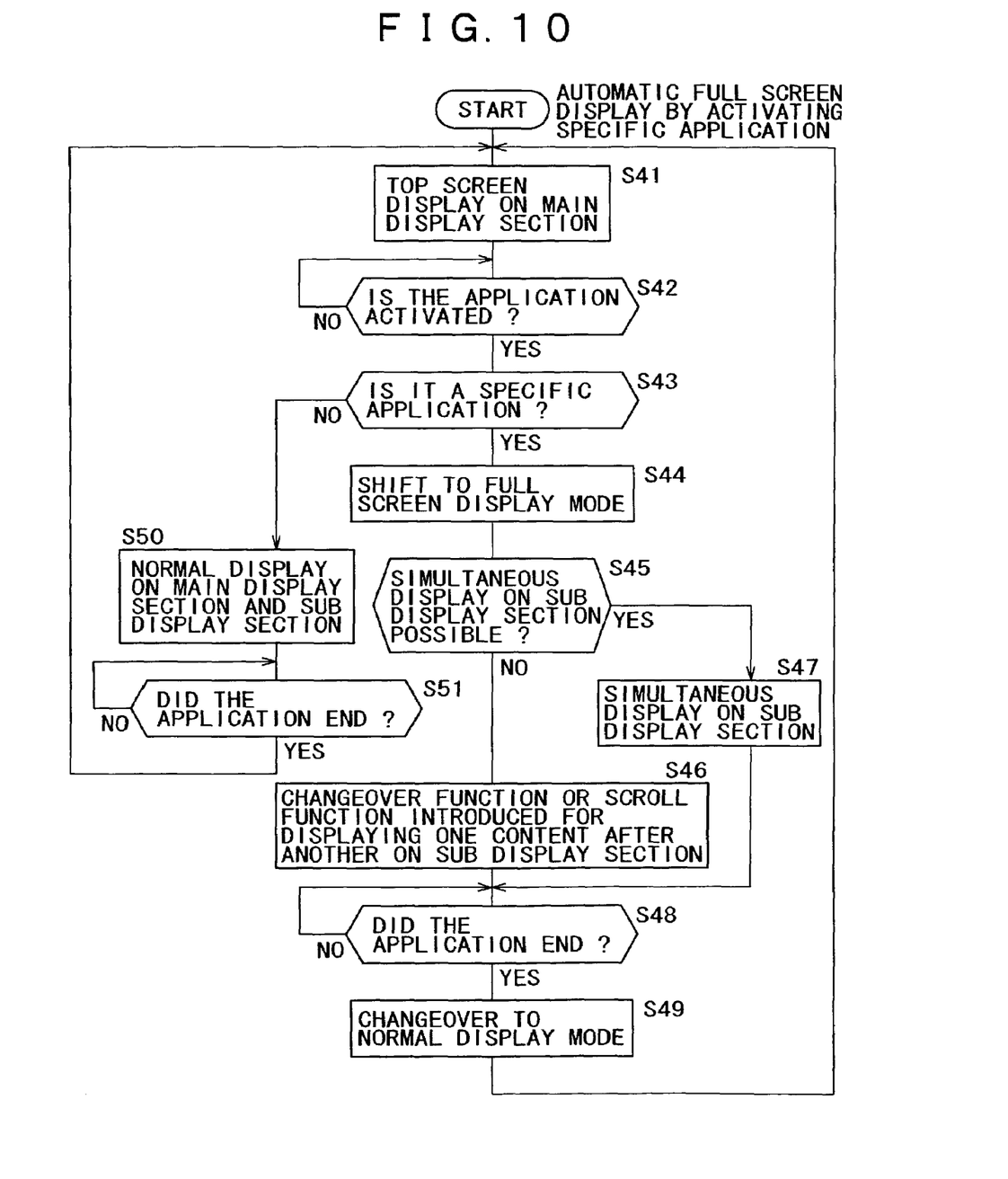
FIG. 10 shows a flowchart depicting an example of display-related processing, according to another preferred embodiment of the present invention.

In the processing of FIG. 10, first, a top screen display is shown on the main display section, in step S41. This is similar to step S11 of FIG. 6. Thereafter, when some application is activated in step S42, there check is performed as to whether the activated application is a predetermined specific application or not, in step S43. If not a specific application, a normal display is provided on the main display section and the sub display section, in step S50. Thereafter, upon termination of the application, with Yes in step S51, a return is made to the first step S41.

If it is found out in Step S43 that a specific application is used, immediately the shift to the full screen display mode is performed in step S44 without depending on the specific key operation by the user. If it is selected that the sub display section can display simultaneously or displays simultaneously, with Yes in step S45, the sub display section executes a simultaneous display, in step S47. In the case where the simultaneous display is impossible or not selected to be executed, i.e., No in step S45, the switch over function or scroll function is introduced ion order to let the sub display section show a partial content in successive order, in step S46.

Subsequently, upon termination of the specific application program with Yes in step S48, the full screen display mode is switched over to the normal display mode in step S49 and the first top screen display is carried out, in step S41.

Description has thus far been made of the mobile terminal having the sub display section. Naturally, an information terminal having at least first, second, and third display areas on the main display section may be considered. In this case, separate contents are displayed, respectively, on the display areas in the normal display mode, whereas in the full screen display mode to which the shift is made due to the predetermined factor, the contents displayed on the first display area of the normal display mode is adapted to be shown over a plurality of display areas, other contents which are shown on display areas other than the first display area used for the full screen display are shown on other display areas. At this evet, if a plurality of contents are shown on the other display areas, a switch over or a scroll display is executed.

While the present invention has been particularly shown and described with reference to preferred embodiments thereof, obviously any modifications, changes, variations, combinations and sub-combinations are possible in light of the above teachings, without departing form the scope and spirit of the present invention. For example, despite the fact that the position of the sub display section is the hinge portion or section of the apparatus or device, other parts will do equally well. In addition, the position of the sub-display section on the hinge does not necessarily have to be in the center of the hinge, but may be deviated from the center. Also, although description has been made of the mobile terminal of the folding type, the present invention is not limited to the mobile terminal of such folding type.

In other words, the present invention has been disclosed in its illustrative form through examples of preferred embodiments, and therefore the contents described in the present specification should not be interpreted in a limitative way. For judgment of the subject matter of the present invention, the following claims should be referred to.

What is claimed is:

1. A mobile terminal apparatus having at least a first, second, third and fourth display area, comprising:
    at least one display section,
    an operating section having various operation keys, and
    a display control means for controlling said display section, said display control means including:
    a first display mode for displaying a performing content related to an application in said first display area and another content on said second and third display areas; and
    a second display mode, for displaying the content displayed on said first display area at least across said first, second and fourth display areas, as well as displaying on said third display area at least part of the content displayed on said second display area and said third display area as well as on said fourth display area; wherein
    a switching between said first display mode and said second display mode is carried out according to a predetermined factor.

2. A mobile terminal apparatus according to claim 1, wherein, under said second display mode, the content displayed on said third display area is subject to switching display or scrolling display according to operation of said operation keys.

3. A mobile terminal apparatus according to claim 1, wherein under said second display mode, said display control means displays a basic screen content on said third display area and changes the displayed content of said third display area upon occurrence of a change of status, from said basic screen to a display content related to said change of status.

4. A mobile terminal apparatus according to claim 3, wherein said display control means, upon changing from said basic screen to said display content related to said change of status, returns the display content of said third display area back to said basic screen after a lapse of time.

5. A mobile terminal apparatus according to claim 1, wherein said display section comprises a main display section and a sub display section, wherein said main display section includes said first and second display areas, and said sub display section includes said third display area.

6. A mobile terminal apparatus according to claim 1, wherein said predetermined factor includes operation of said operation keys.

7. A mobile terminal apparatus according to claim 1, wherein said predetermined factor includes execution and termination of a predetermined application.

8. A mobile terminal apparatus according to claim 2, wherein said display section comprises a main display section and a sub display section, wherein said main display section includes said first and second display areas, and said sub display section includes said third display area.

9. A mobile terminal apparatus according to claim 3, wherein said display section comprises a main display section and a sub display section, wherein said main display section includes said first and second display areas, and said sub display section includes said third display area.

10. A mobile terminal apparatus according to claim 4, wherein said display section comprises a main display section and a sub display section, wherein said main display section includes said first and second display areas, and said sub display section includes said third display area.

11. A mobile terminal apparatus according to claim 6, wherein said display section comprises a main display section and a sub display section, wherein said main display section includes said first and second display areas, and said sub display section includes said third display area.

12. A mobile terminal apparatus according to claim 7, wherein said display section comprises a main display section and a sub display section, wherein said main display section includes said first and second display areas, and said sub display section includes said third display area.

* * * * *